United States Patent
Hunt et al.

(10) Patent No.: US 8,944,768 B2
(45) Date of Patent: Feb. 3, 2015

(54) COMPOSITE TURBINE BLADE AND METHOD OF MANUFACTURE

(71) Applicant: General Electric Company, Schenectady, NY (US)

(72) Inventors: Mark L. Hunt, Simpsonville, SC (US); Paul Stephen Dimascio, Greer, SC (US); Warren Martin Miglietti, Greenville, SC (US); Steve P. Byam, Fountain Inn, SC (US); Matthew James O'Connell, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/906,075

(22) Filed: May 30, 2013

(65) Prior Publication Data

US 2013/0287587 A1  Oct. 31, 2013

Related U.S. Application Data

(63) Continuation of application No. 12/632,584, filed on Dec. 7, 2009, now Pat. No. 8,511,991.

(51) Int. Cl.
*F01D 5/14* (2006.01)
*B23P 15/04* (2006.01)
*F01D 5/28* (2006.01)

(52) U.S. Cl.
CPC .............. *F01D 5/147* (2013.01); *B23P 15/04* (2013.01); *F01D 5/282* (2013.01)
USPC .................. 416/193 A; 416/229 A

(58) Field of Classification Search
USPC ............ 416/193 A, 229 A, 229 R; 29/889.21
See application file for complete search history.

(56) References Cited

U.S. PATENT DOCUMENTS

| | | | |
|---|---|---|---|
| 3,826,592 A * | 7/1974 | Raboin | 416/222 |
| 4,247,254 A | 1/1981 | Zelahy | |
| 4,390,320 A | 6/1983 | Eiswerth | |
| 4,400,137 A * | 8/1983 | Miller et al. | 416/220 R |
| 4,411,597 A | 10/1983 | Koffel et al. | |
| 4,540,339 A | 9/1985 | Horvath | |
| 5,215,442 A * | 6/1993 | Steckle et al. | 416/248 |
| H0001258 H * | 12/1993 | Hindle, Jr. | 416/215 |
| 5,348,446 A | 9/1994 | Lee et al. | |
| 5,611,670 A * | 3/1997 | Yoshinari et al. | 416/241 R |
| 5,673,745 A | 10/1997 | Jackson et al. | |
| 6,183,197 B1 * | 2/2001 | Bunker et al. | 416/95 |
| 6,659,332 B2 * | 12/2003 | Smashey et al. | 228/119 |
| 6,908,288 B2 | 6/2005 | Jackson et al. | |
| 6,916,150 B2 | 7/2005 | Liang | |
| 7,488,157 B2 * | 2/2009 | Marini et al. | 416/193 A |
| 7,648,341 B2 * | 1/2010 | Lau | 416/241 R |
| 8,052,391 B1 | 11/2011 | Brown | |
| 8,333,563 B2 * | 12/2012 | Razzell | 416/193 A |
| 2006/0218788 A1 | 10/2006 | Boulnois et al. | |

* cited by examiner

*Primary Examiner* — Edward Landrum
(74) *Attorney, Agent, or Firm* — Sutherland Asbill & Brennan LLP

(57) ABSTRACT

A composite turbine blade and a method of manufacture thereof is disclosed. The composite turbine blade comprises a turbine blade portion comprising a first material and a first tip plate comprising a second material. The turbine blade portion has an exterior wall and an interior wall surrounding a hollow interior cavity, and a top surface extending from the exterior wall to the interior wall bounding an orifice that is fluidly connected to the hollow interior cavity. The first tip plate may be attached to the turbine blade along the top surface and extending from proximate the exterior wall of the turbine blade across the orifice to cover the orifice.

16 Claims, 6 Drawing Sheets

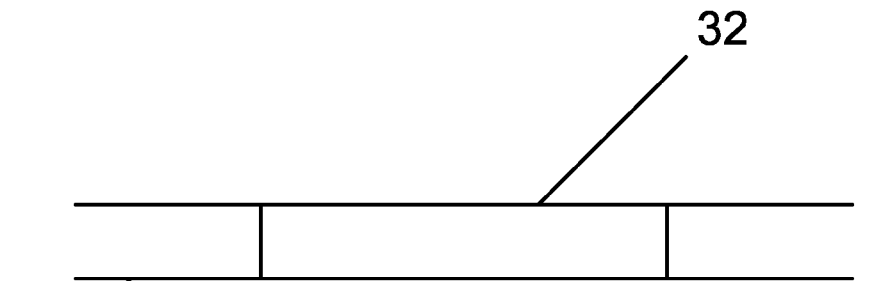
FIG. 6
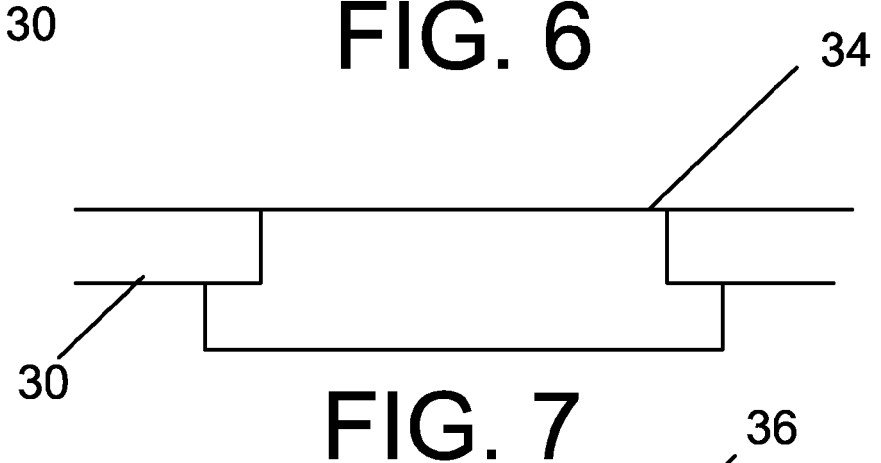
FIG. 7
FIG. 8
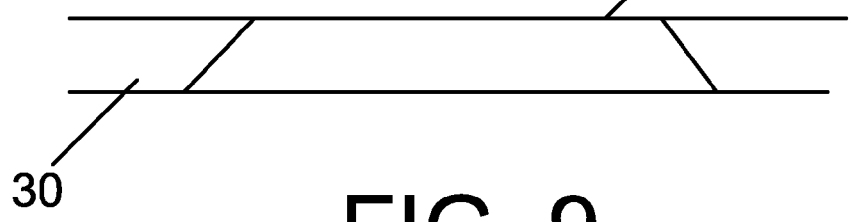
FIG. 9

US 8,944,768 B2

COMPOSITE TURBINE BLADE AND METHOD OF MANUFACTURE

CROSS REFERENCE TO RELATED APPLICATIONS

The present application is a continuation application of U.S. patent application Ser. No. 12/632,584 filed on Dec. 7, 2009. The above application is hereby incorporated by reference for all purposes and made a part of the present disclosure.

STATEMENT REGARDING FEDERALLY SPONSORED RESEARCH OR DEVELOPMENT

Not applicable.

BACKGROUND OF THE INVENTION

This invention is generally in the field of gas turbine engines. More particularly, the present invention is directed to a composite blade for a turbine rotor.

Turbine blades are typically manufactured from a casting process in which a molten alloy is poured into a ceramic mold, heated, and then cooled. When the mold is broken off, the blade is then machined to its final shape. This results in a turbine blade having a substantially uniform composition from the root of the blade to the tip. Thus, the alloy chosen for the turbine blade must have suitable performance properties for the thermal and mechanical stresses encountered at various locations on the blade. Such a manufacturing process may not generally allow for a designer to independently select an optimal alloy for different portions of the turbine blade.

In general, the turbine blade is cast from a creep resistant superalloy. In an exemplary turbine blade casting process, the superalloy is directionally solidified from root tip. During operation, turbine blades tips are exposed to extreme temperatures and stresses which cause them to oxidize and crack. A turbine blade may crack along grain boundaries at or near the tip of the airfoil and the crack will propagate along the length of the airfoil. Eventually a blade may suffer enough damage to compromise the turbine's efficiency. A blade is typically replaced before it reaches this level of damage.

BRIEF SUMMARY OF THE INVENTION

In one aspect, the present invention comprises a composite turbine blade. The composite turbine blade comprises a turbine blade portion comprising a first material and a first tip plate comprising a second material. The turbine blade portion comprises an exterior wall and an interior wall surrounding a hollow interior cavity. The turbine blade portion further comprises a top surface extending from the exterior wall to the interior wall, and the top surface bounds an orifice that is fluidly connected to the hollow interior cavity. The composite turbine blade further comprises a first tip plate comprising a second material attached to the turbine blade along the top surface and extending from proximate the exterior wall of the turbine blade across the orifice to cover the orifice.

In another aspect, the present invention comprises a composite turbine blade having a reinforced platform. The composite turbine blade comprises a turbine portion comprising a first material and an insert portion comprising a second material. The turbine blade portion comprises an airfoil portion having a tip and a root and a platform portion attached to the airfoil portion at the root. The platform portion comprises an orifice passing therethrough and an insert attached within the orifice of the platform portion.

In another aspect, the present invention comprises a method of manufacturing a composite turbine blade. The method comprises (1) providing a turbine blade portion having an exterior wall and an interior wall surrounding a hollow interior cavity, and a top surface extending from the exterior wall to the interior wall bounding an orifice that is fluidly connected to the hollow interior cavity; and (2) attaching a first tip plate to the turbine blade along the top surface so that the first tip plate extends from proximate the exterior wall of the turbine blade across the orifice to cover the orifice. The turbine blade portion comprises a first material and the first tip plate comprises a second material.

BRIEF DESCRIPTION OF THE DRAWINGS

FIGS. 6-9 are section views, illustrating profiles for the insert of a composite turbine blade platform in accordance with an embodiment of this invention.

DETAILED DESCRIPTION OF THE INVENTION

Figure 1:
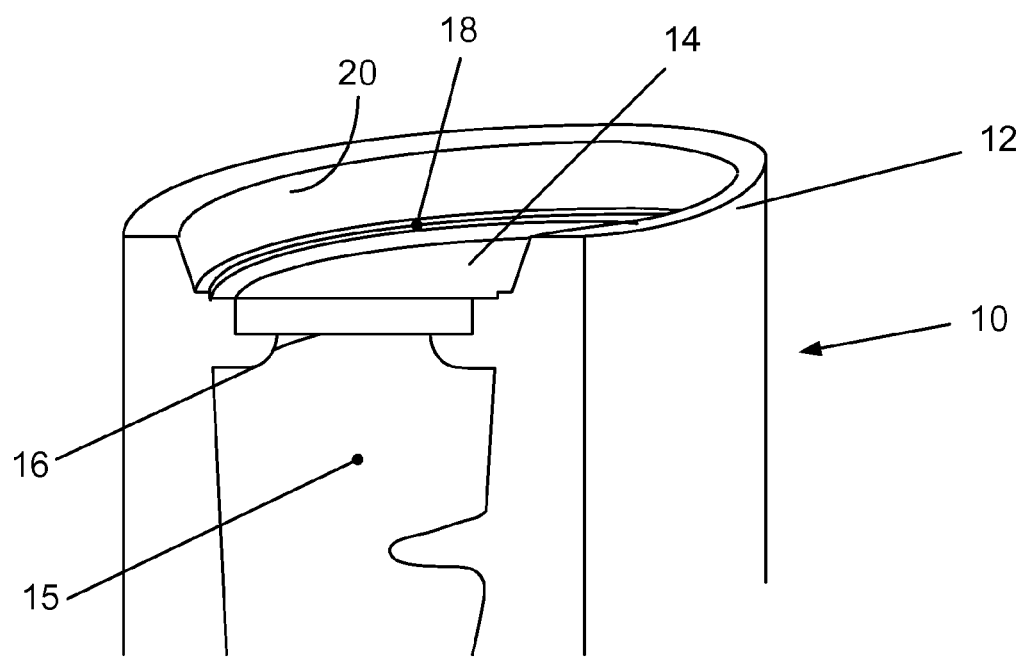
FIG. 1 is a sectioned perspective view, illustrating a prior art turbine blade tip.

FIG. 1 is a sectioned perspective view, illustrating the blade tip 12 of a conventional turbine blade 10. The turbine blade 10 has a hollow interior 15 which is bounded at one end by a tip plate 14. The tip plate 14 mates with a flange 16 which extends inward towards the center of the turbine blade 10. The tip plate 14 is offset from the end of blade tip 12 to form a tip cavity 18 bounded by a wall 20. The tip cavity 18 allows for cooling air to escape the airfoil between the blade tip 12 and the shroud of the casing during operation.

As mentioned previously, the blade tip 12 is exposed to extreme temperatures and stress during operation. This can cause the blade tip 12 to deteriorate over time. Other components of the turbine blade are also subject to extreme stresses which can possibly lead to deterioration of the turbine blade. In one aspect, the present invention comprises a method of repairing a turbine blade to improve the performance or longevity of the blade. In another aspect, the present invention comprises a composite turbine blade. In another aspect, the present invention comprises a method of manufacturing a composite blade.

Figure 2:
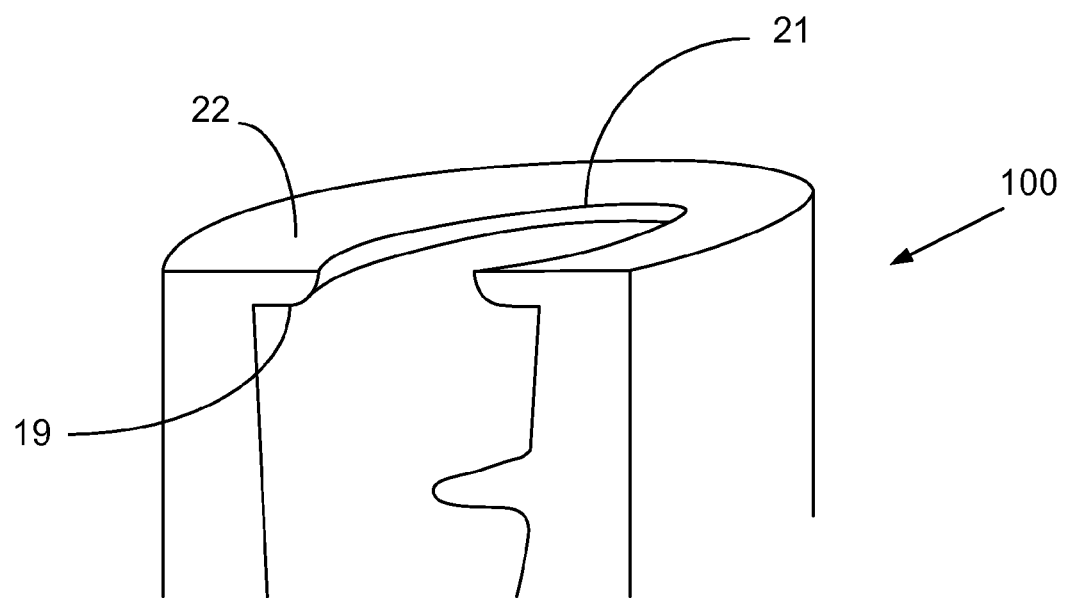
FIG. 2 is a sectioned perspective view, illustrating a part of a process for repairing a turbine blade tip in accordance with an embodiment of this invention.

As illustrated in FIG. 2, a method of manufacturing a composite blade in accordance with an embodiment of this embodiment begins with the step of preparing a turbine blade 100 having a modified top surface 22. The turbine blade 100 of FIG. 2 may be prepared by removing the tip plate 14 and the material of the wall 20 above the flange 16 of the turbine blade 10 of FIG. 1. Alternatively, the turbine blade 100 may be originally cast to have the profile shown in FIG. 2. The modified top surface 22 forms a plane across the flange 19 from the innermost point 21 of the flange 19 to the outer surface of the turbine blade 100.

Figure 3:
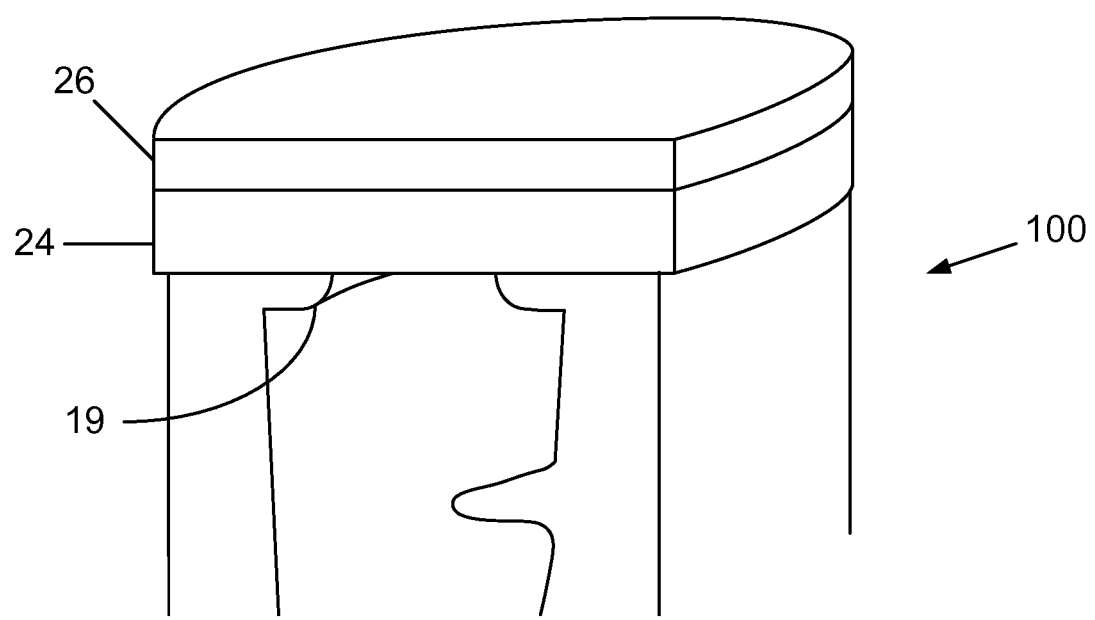
FIG. 3 is a sectioned perspective view, illustrating a part of a process for repairing a turbine blade tip in accordance with an embodiment of this invention.

As illustrated in FIG. 3, the plates 24 and 26 are attached to the modified top surface 22 of FIG. 2. The plate 24 may be attached the plate 26 and the flange 19 by various processes including, but not limited to, brazing, welding, or diffusion bonding. Alternatively, the plates 24 and 26 may consist of weld-deposited materials. The plates 24 and 26 may comprise the same or different materials. In one embodiment, the plate 24 comprises a material that provides excellent mechanical tolerance at high temperatures. In particular, plate 24 may comprise a material which is more resistant to creep than the material of the airfoil of turbine blade 100. Although the preferred material for the plate 24 may vary, René 142™, René 80™, René N4™, René N5™, GTD 111™, and GTD 222™ alloys (General Electric Company) are exemplary materials for the plate 24 because of their resistance to stress rupture at high temperature. In certain embodiments, the plate 26 comprises a material that may withstand even higher temperatures without oxidizing. René 142™ and HAYNES 214™ (Haynes International) alloys are exemplary materials for the plate 26 because of their resistance to oxidation, however many other materials may be used for the plate 26 including, but not limited to, René 195™ (General Electric Company) and HAYNES 230™ (Haynes International) alloys.

Although the present embodiment illustrates the use of two plates (plates 24 and 26), it should be noted that any number of plates may be used. For example, in some embodiments a single plate being both resistant to low cycle fatigue and oxidation may be used. Alternatively, a plurality of plates may be stacked to produce a gradient effect with each plate possessing the optimal properties for the thermodynamic and mechanical stresses at the particular location on the airfoil. For example, an intermediate plate comprising a material having an intermediate level of creep resistance and oxidation resistance relative to the plates 24 and 26 may be added between the plates 24 and 26.

The expression "different material" and variations thereof as used herein encompasses the use of different alloys among different components. The term also encompasses the use of the same alloy in different orientations among different components where the difference in orientation appreciably affects the manner in which the component responds to thermodynamic and mechanical stresses at the particular location where the component is placed on the turbine blade.

Unlike conventional blade tip designs (e.g., the design of FIG. 1), the quality of the bond between the plates 24 and 26 and the turbine blade 100 may be easily inspected without destroying the attached components or the bond. For example, the bond quality may be visually inspected or may be inspected using ultrasonic imaging techniques. As such, a bond quality assessment may be made before proceeding to the next step in the manufacturing process.

Figure 4:
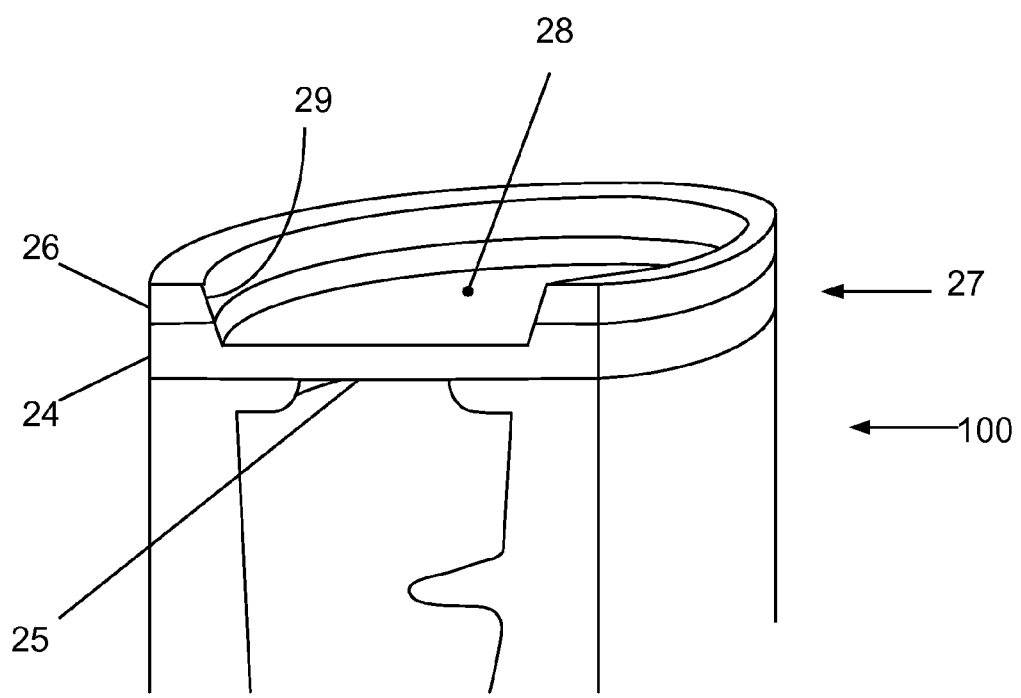
FIG. 4 is a sectioned perspective view, illustrating a composite turbine blade tip in accordance with an embodiment of this invention.

As illustrated in FIG. 4, a blade tip 27 is then formed by machining the plates 24 and 26 to produce a cavity 28 bounded by a wall 29 and a tip plate 25. The cavity 28 is preferably formed by milling away material from the plates 24 and 26 using a CNC milling machine; however, other machining methods may also be used. Further, the exterior walls of plates 24 and 26 may be machined to match the contours of the turbine blade. As such, the interior and exterior profile of wall 29 of the composite blade tip 27 may be made to mimic the wall profiles of the conventional blade tip 12 of FIG. 1 or a new design may be employed. It should be noted that the unique manufacturing process for producing composite blade tip 27 allows for the manufacture of profile designs which would normally be disallowed by the constraints of the casting processes. Although not illustrated herein, in some embodiments the wall 29 may not entirely surround machined cavity 28. For example, the wall 29 may comprise one or more gaps to allow cooling air to escape from the machine cavity 28. As such, the term "substantially surrounding" and variations thereof when referring to the wall 29 of blade tip 27 herein is intended to encompass embodiments where the wall 29 completely surrounds the machined cavity 28 and embodiments where gaps are provided in the wall 29.

The foregoing process may be either used for manufacturing a new turbine blade or retrofitting a composite blade tip 27 to a used turbine blade (for repairing the used turbine blade or improving the performance of the used turbine blade). As mentioned previously, the principle variation in the process relates to the method of producing the modified top surface 22 of FIG. 2. In repairing or retrofitting applications, material must generally be removed from the used turbine blade before the composite blade tip 27 may be added. In new manufacturing applications, the turbine blade component may be manufactured to be shorter in length, and the composite blade tip 27 is then added to the end of the manufactured airfoil component.

In another aspect, the present invention comprises a composite turbine blade 100 having a blade tip 27 produced by the foregoing method. One additional benefit of the blade tip configuration of the present invention is that the tip plate 25 is attached to the turbine blade 100 over a larger contact area than the tip plate 14 of the conventional blade tip design of FIG. 1. This reduces the risk of the tip plate 25 becoming disconnected from the turbine blade 10 during operation. Furthermore, the configuration of the present invention avoids the complexity associated with providing sufficient weld penetration in the conventional blade tip design of FIG. 1.

The turbine blade 100 having a composite blade tip 27 benefits from variation in metallurgical properties at the tip of the blade. As described previously, the material of the plate 24 and the plate 26 may be generally selected to possess the optimal properties for the thermodynamic and mechanical stresses encountered at the particular location on the airfoil. In some embodiments, the blade tip 27 may be designed to simply prevent cracks which initiate in the airfoil from propagating to the tip of the airfoil. In embodiments where this is the principle design criteria, it may not be necessary to use an entirely different alloy for the blade tip 27. For example, the blade tip 27 may comprise the same alloy as the cast portion of the airfoil where the grain orientation of the alloy of blade tip 27 is generally perpendicular to the grain orientation of the cast portion of the airfoil. Such a variation in grain orientation may be considered a "different material" from the material of the cast portion of the airfoil since the orientation appreciably affects the manner in which the component responds to thermodynamic and mechanical stresses at the particular location where the component is placed on the turbine blade (i.e. the orientation of the grain arrests the propagation of the crack).

Figure 5:
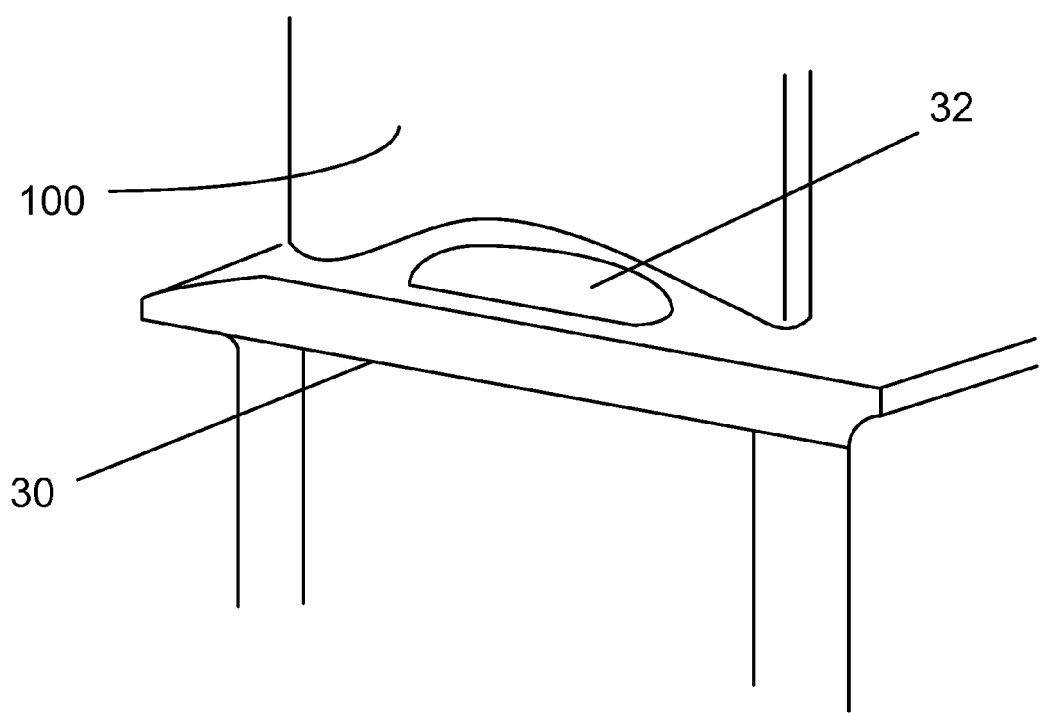
FIG. 5 is a perspective view, illustrating a composite turbine blade platform in accordance with an embodiment of this invention.

As illustrated in FIG. 5, the turbine blade 100 may be further reinforced by modifying the platform 30 to which the root of the airfoil is attached. An insert 32, which comprises a different material from the material of the platform 30, is provided within an orifice formed in platform 30. The orifice may be formed during the casting process used to produce the turbine blade 100. Alternatively, the orifice may be formed after the turbine blade is cast by milling away a portion of the material of the platform 30. The insert 32 adds strength beyond that which is normally provided by the material of the platform 30. As such, the insert 32 makes the platform 30 more strain tolerant. Although various materials may be used for the insert 32, René 80™ René 142™, René 195™ alloys are exemplary materials for the insert 32 because of their excellent resistance to low cycle fatigue.

As with the composite blade tip 27, the insert 32 may be added during the manufacture of a new turbine blade or may be employed as retrofit strengthening or repair solution for a used turbine blade. Similar to the composite blade tip 27, the utilization of an insert 32 allows the metallurgical properties of the platform 30 to be optimized for the thermodynamic and mechanical stresses encountered at each location of the platform 30.

Many different profiles may used for the insert. As illustrated in FIG. 6, the insert 32 may have vertically-straight sidewalls which mate with the vertically-straight sidewalls of the orifice in the platform 30. Alternatively, as illustrated in FIG. 7, the insert 34 may have a "stepped" sidewall which mates with a vertically-straight sidewall of the orifice in the platform 30. In this embodiment, the insert 34 comprises a flange which overlaps a portion of the platform 30. In another embodiment, as illustrated in FIG. 8, the insert 36 may have a stepped sidewall which mates with a orifice having a stepped sidewall in the platform 30. In this embodiment, the platform 30 has a counterbore which mates with the flange of the insert 36. In another embodiment, as illustrated in FIG. 9, the insert 38 has a tapered sidewall which mates with a orifice having a tapered sidewall in the platform 30. In each of the foregoing examples, the insert may be attached to the platform 30 by various processes including, but not limited to, brazing, welding, or diffusion bonding.

EXAMPLE

In one non-limiting example, a turbine blade of a conventional design is uniformly cast using a René 41 superalloy. The turbine blade tip is then modified as shown in FIG. 2 using a CNC machine to form a modified top surface 22 having a flat plane across the flange 19 from the innermost point of the flange 19 to the outer surface of the turbine blade 100. A plate of HAYNES 230™ alloy, corresponding to the plate 24, is then welded to the modified surface 22 as illustrated in FIG. 3. A plate of HAYNES 214™ alloy, corresponding to the plate 26, is then welded to the plate of HAYNES 230™ alloy as illustrated in FIG. 3. The plates of HAYNES 230™ alloy and HAYNES 214™ alloy are then milled using the CNC machine to form the shape of the profile illustrated in FIG. 4.

The platform 30 of the cast turbine blade is then milled using a CNC machine to remove the cast superalloy material in the region of the platform 30 occupied by the insert 32 of FIG. 5 (i.e., the region of the platform 30 partially encircled by the curved face of the turbine blade). An insert 32 is then cut from a plate of HAYNES 214™ alloy to match the shape of the resulting void. The insert 32 is then joined by welding or brazing to the platform 30 as illustrated in FIG. 5.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composite turbine blade comprising:
   a turbine blade portion comprising a first material, the turbine blade portion comprising an airfoil portion having a tip and a root and a platform portion attached to the airfoil portion at the root, the platform portion comprising an orifice passing therethrough; and
   an insert attached within the orifice of the platform portion, the insert comprising a second material;
   wherein the second material comprises a different material than the first material and wherein the second material has a different grain orientation than the first material.

2. The composite turbine blade of claim 1, wherein the second material comprises a material having a greater resistance to low cycle fatigue than the first material.

3. The composite turbine blade of claim 1, wherein the insert comprises a flange portion, the flange portion mating with the platform portion of the composite turbine blade.

4. The composite turbine blade of claim 1, wherein the insert comprises a first tapered sidewall, the first tapered sidewall of the insert mating with a second tapered sidewall of the orifice of the platform portion.

5. The composite turbine blade of claim 1, wherein the second material comprises a material having a greater resistance to oxidation than the first material.

6. The composite turbine blade of claim 1, wherein the grain orientation of the first material is substantially perpendicular to the grain orientation of the second material.

7. A method for reinforcing a composite turbine blade, comprising:
   providing a turbine blade portion comprising a first material, the turbine blade portion comprising an airfoil portion having a tip and a root and a platform portion attached to the airfoil portion at the root, wherein the platform portion comprises an orifice passing therethrough; and
   attaching an insert into the orifice of the platform portion, the insert comprising a second material;
   wherein the second material comprises a different material than the first material and wherein the second material has a different grain orientation than the first material.

8. The method of claim 7, wherein the insert is attached to the platform portion by a method comprising brazing, welding, diffusion bonding, and combinations thereof.

9. The method of claim 7, further comprising milling away a portion of the material of the platform portion to form the orifice.

10. The method of claim 7, wherein the second material comprises a material having a greater resistance to low cycle fatigue than the first material.

11. The method of claim 7, wherein the second material comprises a material having a greater resistance to oxidation than the first material.

12. The method of claim 7, wherein the grain orientation of the first material is substantially perpendicular to the grain orientation of the second material.

13. A method for repairing a composite turbine blade, comprising:
   providing a turbine blade portion comprising a first material, the turbine blade portion comprising an airfoil portion having a tip and a root and a platform portion attached to the airfoil portion at the root;
   cutting the platform portion to produce an orifice passing therethrough; and
   attaching an insert into the orifice of the platform portion, the insert comprising a second material that is a different material than the first material;

wherein the second material has a different grain orientation than the first material.

14. The method of claim 13, wherein the second material comprises a material having a greater resistance to low cycle fatigue than the first material.

15. The method of claim 13, wherein the second material comprises a material having a greater resistance to oxidation than the first material.

16. The method of claim 13, wherein the grain orientation of the first material is substantially perpendicular to the grain orientation of the second material.

\* \* \* \* \*